(12) United States Patent
Sakaguchi et al.

(10) Patent No.: US 9,823,391 B2
(45) Date of Patent: Nov. 21, 2017

(54) NON-PHOTOSENSITIVE RESIN COMPOSITION

(71) Applicant: NISSAN CHEMICAL INDUSTRIES, LTD., Tokyo (JP)

(72) Inventors: Takahiro Sakaguchi, Funabashi (JP); Isao Adachi, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 115 days.

(21) Appl. No.: 14/435,918

(22) PCT Filed: Oct. 4, 2013

(86) PCT No.: PCT/JP2013/077149
§ 371 (c)(1),
(2) Date: Apr. 15, 2015

(87) PCT Pub. No.: WO2014/065100
PCT Pub. Date: May 1, 2014

(65) Prior Publication Data
US 2015/0338556 A1    Nov. 26, 2015

(30) Foreign Application Priority Data
Oct. 23, 2012  (JP) .................. 2012-233995

(51) Int. Cl.
*G02B 3/00* (2006.01)
*C08J 5/18* (2006.01)
(Continued)

(52) U.S. Cl.
CPC .......... *G02B 3/0018* (2013.01); *C08F 220/20* (2013.01); *C08F 220/30* (2013.01);
(Continued)

(58) Field of Classification Search
CPC .................................................... C08F 220/20
See application file for complete search history.

(56) References Cited

U.S. PATENT DOCUMENTS

2002/0048721 A1* 4/2002 Kamiya ................ G03F 7/0046
430/270.1
2002/0055064 A1* 5/2002 Iguchi ..................... G03F 7/091
430/270.1
(Continued)

FOREIGN PATENT DOCUMENTS

| CN | 101 122 740 A | 2/2008 |
| JP | 64-010666 A | 1/1989 |

(Continued)

OTHER PUBLICATIONS

Apr. 6, 2016 European Search Report issued in European Patent Application No. 13848555.2.
(Continued)

*Primary Examiner* — Megan McCulley
(74) *Attorney, Agent, or Firm* — Oliff PLC

(57) ABSTRACT

A non-photosensitive resin composition including: a self-cross-linkable copolymer having structural units of Formulae (1) and (2):
(Continued)

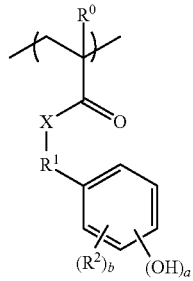

(1)

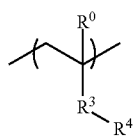

(2)

wherein each $R^0$ is independently a hydrogen atom or methyl group; X is an —O— group or an —NH— group; $R^1$ is a single bond or a $C_{1-6}$ alkylene group; $R^2$ is a $C_{1-6}$ alkyl group; a is an integer of 1 to 5, b is an integer of 0 to 4, and when a and b satisfy $1 \leq a+b \leq 5$, and b is 2, 3, or 4, such $R^2$ optionally differ from each other; $R^3$ is a divalent organic group of Formula (I), Formula (II), or Formula (III), and $R^4$ is an organic group having an epoxy group:

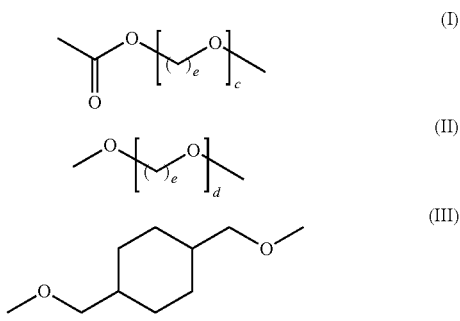

wherein c is an integer of 0 to 3, d is an integer of 1 to 3, and each e is independently an integer of 2 to 6; and a solvent.

13 Claims, 1 Drawing Sheet

(51) Int. Cl.
G02B 1/12 (2006.01)
G02B 1/14 (2015.01)
C08F 220/30 (2006.01)
C08F 220/32 (2006.01)
G02B 1/04 (2006.01)
C08F 220/20 (2006.01)
C08F 220/58 (2006.01)
C08L 63/00 (2006.01)
C08L 33/14 (2006.01)
G02B 1/10 (2015.01)
G02B 5/20 (2006.01)

(52) U.S. Cl.
CPC .......... *C08F 220/32* (2013.01); *C08F 220/58* (2013.01); *C08J 5/18* (2013.01); *C08L 63/00* (2013.01); *G02B 1/04* (2013.01); *G02B 1/12* (2013.01); *G02B 1/14* (2015.01); *C08J 2329/10* (2013.01); *C08J 2333/10* (2013.01); *C08J 2333/26* (2013.01); *C08J 2429/10* (2013.01); *C08J 2433/10* (2013.01); *C08J 2433/26* (2013.01); *C08L 33/14* (2013.01); *G02B 1/105* (2013.01); *G02B 3/0012* (2013.01); *G02B 5/20* (2013.01)

(56) References Cited

U.S. PATENT DOCUMENTS

| | | | |
|---|---|---|---|
| 2004/0192804 A1* | 9/2004 | Kura | C07D 295/112 522/65 |
| 2008/0227037 A1 | 9/2008 | Hatakeyama et al. | |
| 2009/0017397 A1 | 1/2009 | Sugimoto et al. | |
| 2012/0015300 A1 | 1/2012 | Endo et al. | |

FOREIGN PATENT DOCUMENTS

| | | |
|---|---|---|
| JP | 06-112459 A | 4/1994 |
| JP | 2006-111802 A | 4/2006 |
| JP | 2006-251464 A | 9/2006 |
| JP | 2007-033518 A | 2/2007 |
| JP | 2007-171572 A | 7/2007 |
| JP | 2008-069205 A | 3/2008 |
| JP | 2008-165127 A | 7/2008 |
| JP | 2008-257188 A | 10/2008 |
| JP | 2009-015245 A | 1/2009 |
| JP | 2009-020462 A | 1/2009 |
| JP | 2011-138116 A | 7/2011 |
| WO | 2013/005619 A1 | 1/2013 |

OTHER PUBLICATIONS

Jan. 7, 2014 Written Opinion issued in International Application No. PCT/JP2013/077149.
Jan. 7, 2015 International Search Report issued in International Application No. PCT/JP2013/077149.
Jun. 13, 2017 Office Action issued in European Patent Application No. 13 848 555.2.

* cited by examiner

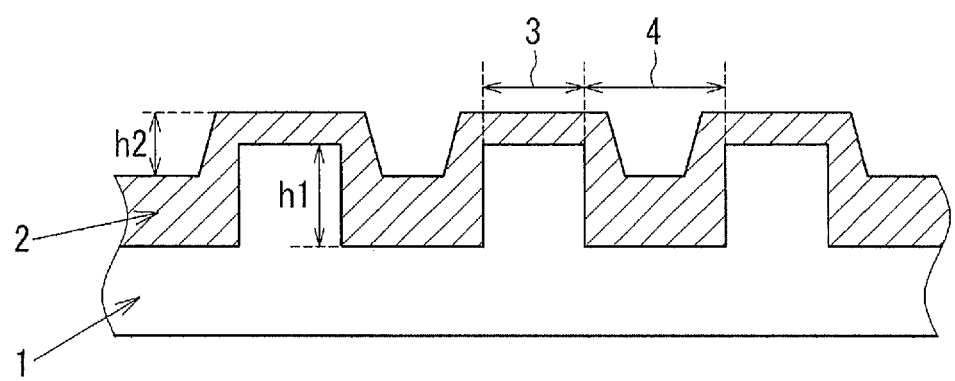

NON-PHOTOSENSITIVE RESIN COMPOSITION

TECHNICAL FIELD

The present invention relates to a non-photosensitive resin composition and to a cured film, a protection film, a planarizing film, and a microlens, which are formed from the non-photosensitive resin composition. The non-photosensitive resin composition of the present invention is a composition containing no photosensitizer such as a quinone diazide compound. Self-cross-linkable copolymers contained in the non-photosensitive resin composition of the present invention are thermally cross-linked with each other without any cross-linkers so as to form a cured film.

BACKGROUND ART

In steps of producing electronic devices such as liquid crystal displays and CCD/CMOS image sensors, these devices are subjected to a process of being exposed to chemical solutions such as solvents, acid solutions, or alkaline solutions, and/or a process of being exposed to high temperatures, such as sputtering, dry etching, and reflow soldering. To prevent a device from being deteriorated or damaged by such processes, a cured film that is resistant to such processes has been formed on the device as a protection film. Such a protection film is required to be, for example, chemical resistant, highly transparent, and heat resistant.

In cases where the cured film is formed on an uneven surface such as a color filter, a cured film having high planarization properties is needed in order to obtain a process margin in following steps and to obtain the uniform characteristics of a device, for example. A microlens has also been produced from such a cured film.

As one of methods for producing microlenses for CCD/CMOS image sensors, an etch back method has been known (Patent Documents 1 and 2). Specifically, a resist pattern is formed on a resin layer for a microlens formed on a color filter, and the resist pattern is reflowed by a thermal treatment to form a lens pattern. The resin layer for a microlens, which is an underlayer, is subjected to etch back by using as an etching mask, the lens pattern formed by reflowing the resist pattern, and the shape of the lens pattern is transferred to the resin layer for a microlens to produce a microlens.

For example, Patent Documents 3 to 5 describe resin compositions used to form microlenses. However, all of the compositions are photosensitive (radiation sensitive) resin composition, and thus they are not suitable materials for forming microlenses by using the etch back method described above.

PRIOR ART DOCUMENTS

Patent Documents

Patent Document 1: Japanese Patent Application Publication No. H1-10666 (JP 01-10666 A)
Patent Document 2: Japanese Patent Application Publication No. H6-112459 (JP 06-112459 A)
Patent Document 3: Japanese Patent Application Publication No. 2006-251464 (JP 2006-251464 A)
Patent Document 4: Japanese Patent Application Publication No. 2007-033518 (JP 2007-033518 A)
Patent Document 5: Japanese Patent Application Publication No. 2007-171572 (JP 2007-171572 A)

SUMMARY OF THE INVENTION

Problem to be Solved by the Invention

The present invention has been completed based on the above circumstances. It is an object of the present invention to provide a resin composition capable of forming a cured film having excellent chemical resistance, heat resistance, transparency, and planarization properties. It is another object of the present invention to provide a microlens having excellent chemical resistance, heat resistance, and transparency.

Means for Solving the Problem

As a result of intensive study for solving the above issues, the inventors of the present invention have completed the present invention. Specifically, the present invention provides a non-photosensitive resin composition comprising: a self-cross-linkable copolymer having structural units of Formulae (1) and (2):

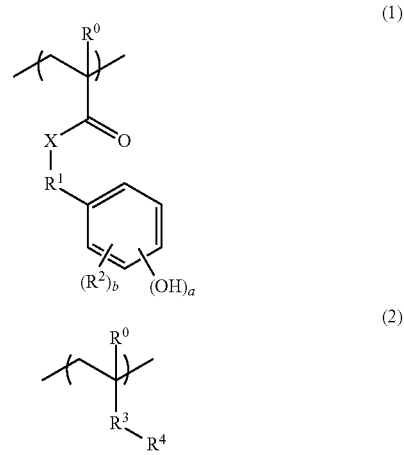

(in Formulae (1) and (2), each $R^0$ is independently a hydrogen atom or a methyl group; X is an —O— group or an —NH— group; $R^1$ is a single bond or a $C_{1-6}$ alkylene group; $R^2$ is a $C_{1-6}$ alkyl group; a is an integer of 1 to 5, b is an integer of 0 to 4, and when a and b satisfy $1 \leq a+b \leq 5$, and b is 2, 3, or 4, such $R^2$ optionally differ from each other; $R^3$ is a divalent organic group of Formula (I), Formula (II), or Formula (III), and when $R^3$ is a divalent organic group of Formula (I), a carbonyl group in Formula (I) is bonded to a main chain of a structural unit of Formula (2); and $R^4$ is an organic group having an epoxy group):

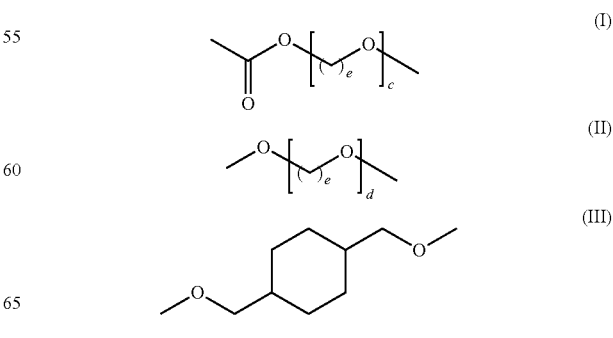

(in Formulae (I), (II), and (III), c is an integer of 0 to 3, d is an integer of 1 to 3, and each e is independently an integer of 2 to 6); and a solvent.

A structural unit of Formula (2) is, for example, a structural unit of Formula (2-1) or Formula (2-2):)

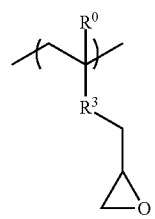

(2-1)

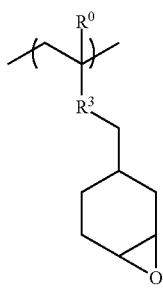

(2-2)

(in Formulae (2-1) and (2-2), each $R^0$ is independently a hydrogen atom or a methyl group; and $R^3$ is a divalent organic group of Formula (I), Formula (II), or Formula (III)).

The self-cross-linkable copolymer is a copolymer further having at least one of structural units of Formulae (3) to (6):

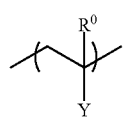

(3)

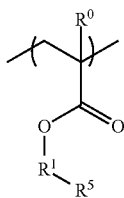

(4)

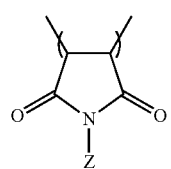

(5)

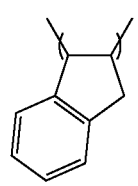

(6)

(in Formulae (3) to (6), each $R^0$ is independently a hydrogen atom or a methyl group; $R^1$ is a single bond or a $C_{1-6}$ alkylene group; Y is a phenyl group, a biphenylyl group, or a naphthyl group, in which a part or all of hydrogen atoms of the phenyl group, the biphenylyl group, and the naphthyl group are optionally substituted with a $C_{1-10}$ alkyl group, a $C_{1-10}$ alkoxy group, a hydroxy group, a cyano group, or a halogeno group; $R^5$ is a linear, branched, or cyclic hydrocarbon group having a carbon atom number of 1 to 20, a phenyl group, a biphenylyl group, a naphthyl group, a $C_{1-10}$ alkoxy group, a phenoxy group, a biphenoxy group, or a naphthoxy group; Z is a $C_{1-5}$ alkyl group, a $C_5$ or $C_6$ cycloalkyl group, a phenyl group, or a benzyl group, in which a part or all of hydrogen atoms of the alkyl group, the cycloalkyl group, the phenyl group, and the benzyl group in Z are optionally substituted with a halogen group or a hydroxy group).

A non-photosensitive resin composition of the present invention is, for example, a resin composition for protection films, a resin composition for planarizing films, or a resin composition for microlenses. The present invention also provides a cured film obtained from the non-photosensitive resin composition. The present invention further provides a protection film, a planarizing film, or a microlens produced from the non-photosensitive resin composition. The microlens is produced by the etch back method described above. More precisely, a microlens is produced by applying the non-photosensitive resin composition onto a base material, and baking the non-photosensitive resin composition to form a resin film; forming a resist pattern on the resin film; reflowing the resist pattern by heat treatment to form a lens pattern; and etching back the resin film by using the lens pattern as a mask to transfer the shape of the lens pattern to the resin film.

Effects of the Invention

Because a self-cross-linkable copolymer is used as the component of a non-photosensitive resin composition of the present invention, a thermosetting cured film that has excellent chemical resistance, heat resistance, transparency, and planarization properties upon heating can be formed. Accordingly, in steps of forming a cured film from a non-photosensitive resin composition of the present invention, or in steps of forming peripheral devices such as wiring when the cured film is used as a material of a semiconductor device or the like, a process of exposing the devices to chemical solutions such as solvents, acid solutions, or alkaline solutions, and/or a process of exposing the devices to high temperatures, such as sputtering, dry etching, and reflow soldering are conducted. In such cases, possibilities of deterioration or damage of the cured film or the device, such as coloring or deformation can be significantly reduced.

In cases where a protection film, a planarizing film, or a microlens is formed from a non-photosensitive resin composition of the present invention, and a resist is applied thereon, or in cases where a step of forming an electrode/wire is conducted, problems such as mixing with a resist, and deformation and detachment of the protection film, the planarizing film, or the microlens caused by chemical solutions can also be significantly reduced.

Accordingly, the non-photosensitive resin composition of the present invention is suitable as a material for forming protection films, planarizing films, and microlenses.

BRIEF DESCRIPTION OF THE DRAWINGS

FIG. 1 is a schematic drawing of a cured film formed by applying a non-photosensitive resin composition of the present invention onto a substrate with a level difference, and baking the non-photosensitive resin composition.

MODES FOR CARRYING OUT THE INVENTION

The present invention provides a non-photosensitive resin composition comprising a self-cross-linkable copolymer and a solvent. Hereinafter, each of the components will be described in detail. A solid content, which is the content excluding the solvent, of a non-photosensitive resin composition of the present invention is typically 1% by mass to 50% by mass.

<Copolymer>

A self-cross-linkable copolymer contained in a non-photosensitive resin composition of the present invention is a copolymer having structural units of Formula (1) and Formula (2).

Specific examples of the compound (monomer) that forms a structural unit of Formula (1) include 2-hydroxyphenyl (meth)acrylate, 3-hydroxyphenyl(meth)acrylate, 4-hydroxyphenyl(meth)acrylate, 4-hydroxybenzyl(meth)acrylate, 4-hydroxyphenethyl(meth)acrylate, 3,5-dimethyl-4-hydroxyphenyl(meth)acrylate, 3,5-dimethyl-4-hydroxybenzyl (meth)acrylate, 3,5-dimethyl-4-hydroxyphenethyl(meth) acrylate, N-(2-hydroxyphenyl)(meth)acrylamide, N-(3-hydroxyphenyl)(meth)acrylamide, N-(4-hydroxyphenyl) (meth)acrylamide, N-(4-hydroxybenzyl)(meth)acrylamide, N-(4-hydroxyphenethyl)(meth)acrylamide, N-(3,5-dimethyl-4-hydroxyphenyl)(meth)acrylamide, N-(3,5-dimethyl-4-hydroxybenzyl)(meth)acrylamide, and N-(3,5-dimethyl-4-hydroxyphenethyl)(meth)acrylamide. These compounds may be used singly, or two or more of them may be used in combination. In the present specification, (meth)acrylate refers to methacrylate and acrylate, and (meth)acrylamide refers to methacrylamide and acrylamide.

Specific examples of the compound (monomer) that forms a structural unit of Formula (2) include monomers of Formulae (2-3) to (2-18) below. These monomers may be used singly, or two or more of them may be used in combination.

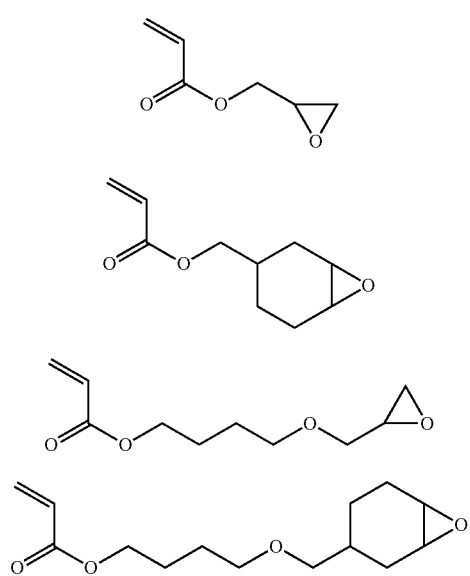

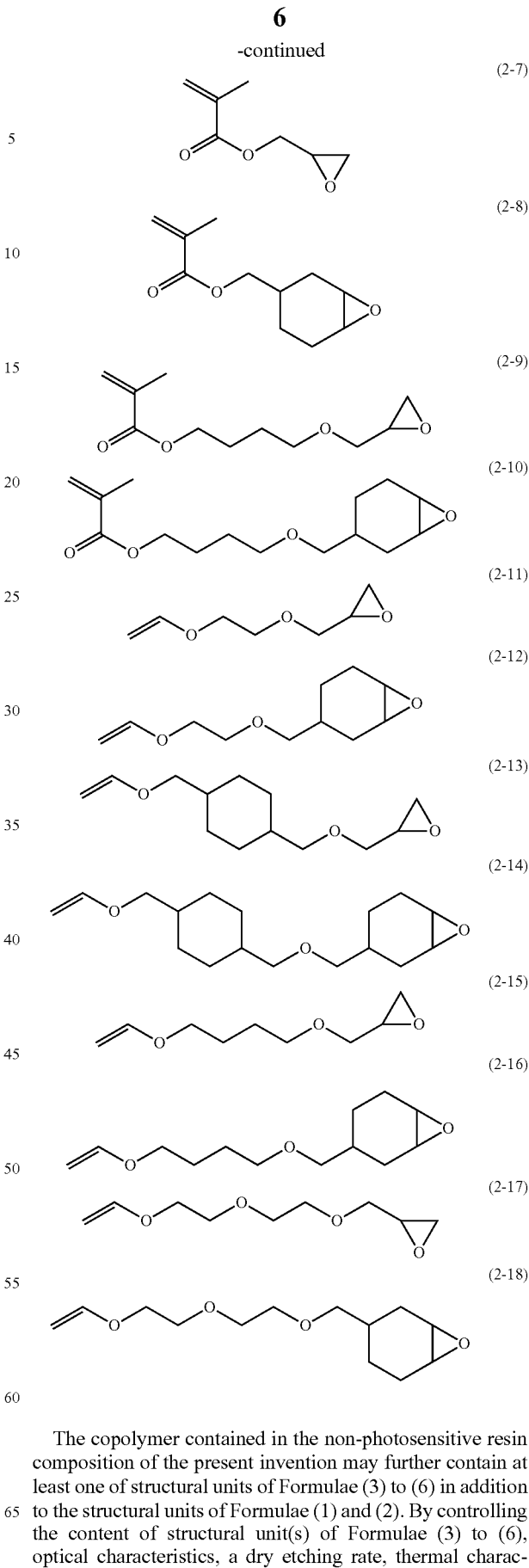

The copolymer contained in the non-photosensitive resin composition of the present invention may further contain at least one of structural units of Formulae (3) to (6) in addition to the structural units of Formulae (1) and (2). By controlling the content of structural unit(s) of Formulae (3) to (6), optical characteristics, a dry etching rate, thermal characteristics, and level difference planarization properties of the cured film can be controlled over a broader range.

Specific examples of the compound (monomer) that forms a structural unit of Formula (3) include styrene, α-methylstyrene, 2-methylstyrene, 3-methylstyrene, 4-methylstyrene, 4-tert-butylstyrene, 4-methoxystyrene, 4-hydroxystyrene, 4-cyanostyrene, 4-fluorostyrene, 4-chlorostyrene, 4-bromostyrene, 4-vinylbiphenyl, 1-vinylnaphthalene, and 2-vinylnaphthalene. These compounds may be used singly, or two or more of them may be used in combination.

Specific examples of the compound (monomer) that forms a structural unit of Formula (4) include methyl(meth)acrylate, ethyl(meth)acrylate, n-butyl(meth)acrylate, isobornyl(meth)acrylate, dicyclopentanyl(meth)acrylate, 2-adamantyl(meth)acrylate, phenyl(meth)acrylate, benzyl(meth)acrylate, phenethyl(meth)acrylate, phenoxyethyl(meth)acrylate, 2-biphenoxyethyl(meth)acrylate, and 2-naphthoxyethyl(meth)acrylate. These compounds may be used singly, or two or more of them may be used in combination.

Specific examples of the compound (monomer) that forms a structural unit of Formula (5) include N-methylmaleimide, N-ethylmaleimide, N-cyclohexylmaleimide, N-phenylmaleimide, N-benzylmaleimide, and N-(2,4,6-trichlorophenyl)maleimide. These compounds may be used singly, or two or more of them may be used in combination.

In the copolymer having structural units of Formula (1) and Formula (2), a content of the structural unit of Formula (1) is 5 mol % to 95 mol %, preferably 10 mol % to 90 mol %, and a content of the structural unit of Formula (2) is 5 mol % to 95 mol %, preferably 10 mol % to 90 mol %, relative to a total content of the structural unit of Formula (1) and the structural unit of Formula (2) as 100 mol %.

In the copolymer having structural units of Formula (1) and Formula (2), and further having at least one of structural units of Formulae (3) to (6), a content of the structural unit of Formula (1) is 5 mol % to 90 mol %, preferably 10 mol % to 80 mol %, a content of the structural unit of Formula (2) is 5 mol % to 90 mol %, preferably 10 mol % to 80 mol %, and a content of at least one of structural units of Formulae (3) to (6) (in cases where two or more of the structural units are contained, a total content of these structural units) is 5 mol % to 90 mol %, preferably 10 mol % to 80 mol %, relative to a total content of the structural unit of Formula (1), the structural unit of Formula (2), and the at least one of structural units of Formulae (3) to (6) as 100 mol %.

A weight-average molecular weight of the copolymer is typically 1,000 to 100,000, preferably 3,000 to 50,000. The weight-average molecular weight refers to a value obtained by gel permeation chromatography (GPC) with polystyrene as a standard sample.

A content of the self-cross-linkable copolymer in the non-photosensitive resin composition of the present invention is, for example, 1% by mass to 99% by mass, or 5% by mass to 95% by mass, or 50% by mass to 100% by mass based on a solid content of the resin composition.

Although a method for obtaining the self-cross-linkable copolymer is not particularly limited in the present invention, the self-cross-linkable copolymer is obtained typically by subjecting the compound (monomer) that forms structural units of Formulae (1) and (2) or the compound (monomer) that forms at least one of structural units of Formulae (3) to (6) in addition to the compound (monomer) that forms structural units of Formulae (1) and (2) to a polymerization reaction that is performed generally at a temperature within a range of 50° C. to 120° C. in a solvent containing a polymerization initiator. The copolymer thus obtained is typically in a solution state in which the copolymer is dissolved in a solvent. In such a state, the copolymer can also be used for a non-photosensitive resin composition of the present invention without isolation.

A solution of the self-cross-linkable copolymer thus obtained is poured into a stirred poor solvent, such as hexane, diethyl ether, methanol, or water to reprecipitate the copolymer. The resultant precipitate is filtrated and washed, and then is dried at room temperature or dried by heating under atmospheric pressure or reduced pressure to prepare a powder of the copolymer. By such an operation, the polymerization initiator and an unreacted compound that coexist with the self-cross-linkable copolymer can be removed. In the present invention, the powder of the self-cross-linkable copolymer may be used as it is or the powder may be redissolved, for example, in a solvent that will be described later, and the obtained solution may be used.

Although a method for preparing a non-photosensitive resin composition of the present invention is not particularly limited, an example thereof is a method in which a copolymer having structural units of Formula (1) and Formula (2), or a copolymer having structural units of Formula (1) and Formula (2) and at least one of structural units of Formulae (3) to (6) is dissolved in a solvent to make a homogeneous solution. Another example thereof is a method in which if necessary, another additive is further added and mixed at an appropriate step of the method for preparing a non-photosensitive resin composition.

The solvent is not particularly limited as long as it dissolves copolymers. Examples of the solvent include ethylene glycol monomethyl ether, ethylene glycol monoethyl ether, methyl cellosolve acetate, ethyl cellosolve acetate, diethylene glycol monomethyl ether, diethylene glycol monoethyl ether, propylene glycol, propylene glycol monomethyl ether, propylene glycol monomethylether acetate, propylene glycol monoethyl ether, propylene glycol monoethyl ether acetate, propylene glycol monopropyl ether, propylene glycol monopropyl ether acetate, propylene glycol monobutyl ether, propylene glycol monobutyl ether acetate, toluene, xylene, methyl ethyl ketone, cyclopentanone, cyclohexanone, ethyl 2-hydroxypropionate, ethyl 2-hydroxy-2-methyl propionate, ethoxy ethyl acetate, hydroxy ethyl acetate, methyl 2-hydroxy-3-methyl butanoate, methyl 3-methoxy propionate, ethyl 3-methoxy propionate, ethyl 3-ethoxy propionate, methyl 3-ethoxy propionate, methyl pyruvate, ethyl acetate, butyl acetate, ethyl lactate, butyl lactate, 2-heptanone, and γ-butyrolactone. These solvents may be used singly, or two or more of them may be used in combination.

Among these solvents, propylene glycol monomethyl ether, propylene glycol monomethyl ether acetate, propylene glycol monoethyl ether, propylene glycol monopropyl ether, 2-heptanone, γ-butyrolactone, ethyl lactate, butyl lactate, cyclopentanone, and cyclohexanone are preferred, from the viewpoint of improving the leveling property of a coating formed by applying a non-photosensitive resin composition of the present invention onto a substrate.

A non-photosensitive resin composition of the present invention may also contain a curing accelerator in order to improve curability.

Examples of the curing accelerator include phosphines, such as triphenylphosphine, tributylphosphine, tris(4-methylphenyl)phosphine, tris(4-nonylphenyl)phosphine, tris(4-methoxyphenyl)phosphine, tris(2,6-dimethoxyphenyl)phosphine, and triphenylphosphine triphenylborane; quaternary phosphonium salts, such as tetraphenylphosphonium chloride, tetraphenylphosphonium bromide, benzyltriphenylphosphonium chloride, benzyltriphenylphosphonium bromide, ethyltriphenylphosphonium chloride, ethyltriphenylphosphonium bromide, tetraphenylphosphonium tetraphenyl borate, tetraphenylphosphonium tetra(4-methylphenyl)borate, tetraphenylphosphonium tetra(4-methoxyphenyl)borate, and tetraphenylphosphonium tetra (4-fluorophenyl)borate; imidazoles, such as 2-methyl imidazole and 2-ethyl-4-methyl imidazole; imidazolium salts, such as 2-ethyl-4-methyl imidazole tetraphenyl borate; diazabicyclo alkenes, such as 1,8-diazabicyclo[5.4.0]-7-undecene and 1,5-diazabicyclo[4.3.0]-5-nonene; organic acid salts of diazabicyclo alkenes, such as formate of 1,8-diazabicyclo[5.4.0]-7-undecene and 2-ethyl hexanoate of 1,8-diazabicyclo[5.4.0]-7-undecene; and quaternary ammonium salts, such as tetraethyl ammonium chloride, benzyl trimethyl ammonium chloride, benzyl trimethyl ammonium bromide, benzyl triethyl ammonium chloride, benzyl triethyl ammonium bromide, benzyl tripropyl ammonium chloride, benzyl tripropyl ammonium bromide, tetramethyl ammonium chloride, tetraethyl ammonium bromide, tetrapropyl ammonium chloride, and tetrapropyl ammonium bromide. These curing accelerators may be used singly, or two or more of them may be used in combination.

When the curing accelerator is used, a content thereof in the non-photosensitive resin composition of the present invention is 0.001% by mass to 10% by mass, preferably 0.01% by mass to 5% by mass, and more preferably 0.1% by mass to 2% by mass based on a solid content of the non-photosensitive resin composition.

A non-photosensitive resin composition of the present invention may also contain a surfactant in order to improve coating performance.

Examples of the surfactant include nonionic surfactants including polyoxyethylene alkylethers, such as polyoxyethylene lauryl ether, polyoxyethylene stearyl ether, polyoxyethylene cetyl ether, and polyoxyethylene oleyl ether; polyoxyethylene alkylarylethers, such as polyoxyethylene octylphenyl ether and polyoxyethylene nonylphenyl ether; polyoxyethylene-polyoxypropylene block copolymers; sorbitan fatty acid esters, such as sorbitan monolaurate, sorbitan monopalmitate, sorbitan monostearate, sorbitan monooleate, sorbitan trioleate, and sorbitan tristearate; and polyoxyethylene sorbitan fatty acid esters, such as polyoxyethylene sorbitan monolaurate, polyoxyethylene sorbitan monopalmitate, polyoxyethylene sorbitan monostearate, polyoxyethylene sorbitan trioleate, and polyoxyethylene sorbitan tristearate; fluorine surfactants including Eftop [registered trademark] EF301, EF303, and EF352 (manufactured by Mitsubishi Materials Electronic Chemicals Co., Ltd.), MEGAFAC [registered trademark] F-171, F-173, and R-30 (manufactured by DIC Corporation), Fluorad FC430 and FC431 (manufactured by Sumitomo 3M Limited), Asahi-Guard [registered trademark] AG710, SURFLON [registered trademark] S-382, SC101, SC102, SC103, SC104, SC105, and SC106 (manufactured by Asahi Glass Co., Ltd.), and Ftergent series, such as FTX-206D, FTX-212D, FTX-218, FTX-220D, FTX-230D, FTX-240D, FTX-212P, FTX-220P, FTX-228P, and FTX-240G (manufactured by NEOS Company Limited); and organosiloxane polymer KP341 (manufactured by Shin-Etsu Chemical Co., Ltd.). These surfactants may be used singly, or two or more of them may be used in combination.

When the surfactant is used, a content thereof in the non-photosensitive resin composition of the present invention is 0.0001% by mass to 3% by mass, preferably 0.001% by mass to 1% by mass, and more preferably 0.01% by mass to 0.5% by mass based on a solid content of the non-photosensitive resin composition.

A cross-linker is not necessarily added to the non-photosensitive resin composition of the present invention because a copolymer contained in the composition is a self cross-linking-type. However, if necessary, the non-photosensitive resin composition of the present invention may contain a cross-linker as long as the effects of the present invention are not impaired. Also if necessary, the non-photosensitive resin composition of the present invention may contain additive(s), such as an ultraviolet absorber, a sensitizer, a plasticizer, an antioxidant, an adhesion auxiliary agent, and an antifoaming agent as long as the effects of the present invention are not impaired.

<Method for Producing Cured Film, Protection Film, and Planarizing Film>

A method for producing a cured film, a protection film, and a planarizing film by using a non-photosensitive resin composition of the present invention will be described. A non-photosensitive resin composition of the present invention is applied onto a base material (for example, a semiconductor substrate, a glass substrate, a quartz substrate, a silicon wafer, or any of these substrates on the surface of which a variety of metal films, a color filter, or the like is formed) by a suitable coating method using a spinner, a coater, or the like. The non-photosensitive resin composition is then baked to be cured by using a heating device such as a hot plate or an oven, so that a cured film, a protection film, or a planarizing film is produced.

The condition of baking is appropriately selected from a temperature range of 80 to 300° C. and a time range of 0.3 to 60 minutes. This baking step may be conducted two times or more.

The film thickness of a film formed from a non-photosensitive resin composition of the present invention is, for example, 0.001 µm to 100 µm, preferably 0.01 µm to 10 µm.

<Method for Producing Microlens>

A method for producing a microlens by using a non-photosensitive resin composition of the present invention will be described. A non-photosensitive resin composition of the present invention is applied onto a base material (for example, a semiconductor substrate, a glass substrate, a quartz substrate, a silicon wafer, and any of these substrates on the surface of which a variety of metal films, a color filter, or the like is formed) by a suitable coating method using a spinner, a coater, or the like. The non-photosensitive resin composition is then baked to be cured by using a heating device such as a hot plate or an oven, so that a resin film is produced.

The condition of baking is appropriately selected from a temperature range of 80 to 300° C. and selected from a time range of 0.3 to 60 minutes for. This baking step may be conducted two times or more.

The film thickness of a film formed from a non-photosensitive resin composition of the present invention is, for example, 0.01 µm to 100 µm, preferably 0.1 µm to 10 µm.

After that, a resist is applied onto the produced resin film; exposure is conducted through a predetermined mask; Post Exposure Bake (PEB) is conducted if necessary; and alkaline development, rinsing, and drying are conducted to form a predetermined resist pattern. To conduct exposure, for example, a g-line, an I-line, a KrF excimer laser, or an ArF excimer laser can be used.

Then, the resist pattern is reflowed by a thermal treatment to form a lens pattern. A resin film, which is an underlayer, is subjected to etch back by using the lens pattern as an etching mask, and the shape of the lens pattern is transferred to the resin film for a microlens, so that a microlens is produced.

EXAMPLES

The present invention will be described in further detail according to Examples and Comparative Examples; however, the present invention is not limited to these examples.

[Measurement of Weight-Average Molecular Weight of Copolymer Obtained in Synthesis Examples Below]

Device: GPC system manufactured by JASCO Corporation

Column: Shodex [registered trademark] KF-804L and 803L

Column Oven: 40° C.

Flow Amount: 1 mL/minute

Eluent: tetrahydrofuran

[Synthesis of Self-Cross-Linkable Copolymer]

Synthesis Example 1

10.0 g of 4-hydroxyphenyl methacrylate, 8.0 g of a monomer of Formula (2-7), and 0.90 g of 2,2'-azobisisobutyronitrile were dissolved in 35.1 g of propylene glycol monomethylether. The solution was then added dropwise over four hours into a flask in which 21.6 g of propylene glycol monomethylether was kept at 70° C. After the dropwise addition was completed, the mixture was further reacted for 18 hours to obtain the solution of a copolymer (the concentration of the solid content was 25% by mass). The weight-average molecular weight, Mw, of the obtained copolymer was 21,000 (in terms of polystyrene).

Synthesis Example 2

5.2 g of 4-hydroxyphenyl methacrylate, 4.2 g of a monomer of Formula (2-7), 9.1 g of styrene, and 0.92 g of 2,2'-azobisisobutyronitrile were dissolved in 36.0 g of propylene glycol monomethylether acetate. The solution was then added dropwise over four hours into a flask in which 22.2 g of propylene glycol monomethylether acetate was kept at 70° C. After the dropwise addition was completed, the mixture was further reacted for 18 hours to obtain the solution of a copolymer (the concentration of the solid content was 25% by mass). The weight-average molecular weight, Mw, of the obtained copolymer was 22,000 (in terms of polystyrene).

Synthesis Example 3

5.0 g of 4-hydroxyphenyl methacrylate, 5.0 g of a monomer of Formula (2-7), 11.9 g of 2-vinylnaphthalene, and 1.1 g of 2,2'-azobisisobutyronitrile were dissolved in 34.5 g of propylene glycol monomethylether acetate. The solution was then added dropwise over four hours into a flask in which 19.2 g of propylene glycol monomethylether acetate was kept at 70° C. After the dropwise addition was completed, the mixture was further reacted for 18 hours to obtain the solution of a copolymer (the concentration of the solid content was 30.2% by mass). The weight-average molecular weight, Mw, of the obtained copolymer was 11,500 (in terms of polystyrene).

Synthesis Example 4

7.5 g of 4-hydroxyphenyl methacrylamide, 12.7 g of a monomer of Formula (2-5), and 1.4 g of 2,2'-azobisisobutyronitrile were dissolved in 40.2 g of propylene glycol monomethylether. The solution was then added dropwise over four hours into a flask in which 24.7 g of propylene glycol monomethylether was kept at 70° C. After the dropwise addition was completed, the mixture was further reacted for 18 hours to obtain the solution of a copolymer (the concentration of the solid content was 23.8% by mass). The weight-average molecular weight, Mw, of the obtained copolymer was 9,400 (in terms of polystyrene).

Synthesis Example 5

4.6 g of 4-hydroxyphenyl methacrylamide, 3.7 g of a monomer of Formula (2-7), 12.0 g of 2-vinylnaphthalene, and 1.1 g of 2,2'-azobisisobutyronitrile were dissolved in 39.7 g of propylene glycol monomethylether. The solution was then added dropwise over four hours into a flask in which 24.4 g of propylene glycol monomethylether was kept at 70° C. After the dropwise addition was completed, the mixture was further reacted for 18 hours to obtain the solution of a copolymer (the concentration of the solid content was 25.0% by mass). The weight-average molecular weight, Mw, of the obtained copolymer was 9,600 (in terms of polystyrene).

Synthesis Example 6

6.3 g of 4-hydroxyphenyl methacrylamide, 8.5 g of a monomer of Formula (2-5), 8.6 g of 4-methoxystyrene, and 1.2 g of 2,2'-azobisisobutyronitrile were dissolved in 36.9 g of propylene glycol monomethylether. The solution was then added dropwise over four hours into a flask in which 20.5 g of propylene glycol monomethylether was kept at 70° C. After the dropwise addition was completed, the mixture was further reacted for 18 hours to obtain the solution of a copolymer (the concentration of the solid content was 29.4% by mass). The weight-average molecular weight, Mw, of the obtained copolymer was 16,800 (in terms of polystyrene).

Synthesis Example 7

7.5 g of 4-hydroxyphenyl methacrylate, 8.3 g of a monomer of Formula (2-8), 8.8 g of styrene, and 1.5 g of 2,2'-azobisisobutyronitrile were dissolved in 39.0 g of propylene glycol monomethylether acetate. The solution was then added dropwise over four hours into a flask in which 21.7 g of propylene glycol monomethylether acetate was kept at 70° C. After the dropwise addition was completed, the mixture was further reacted for 18 hours to obtain the solution of a copolymer (the concentration of the solid content was 29.9% by mass). The weight-average molecular weight, Mw, of the obtained copolymer was 13,900 (in terms of polystyrene).

Synthesis Example 8

5.5 g of 4-hydroxyphenyl methacrylate, 7.0 g of a monomer of Formula (2-13), 2.2 g of 4-vinylbiphenyl, 8.9 g of N-cyclohexylmaleimide, and 1.2 g of 2,2'-azobisisobutyronitrile were dissolved in 37.1 g of cyclohexanone. The solution was then added dropwise over four hours into a flask in which 20.6 g of cyclohexanone was kept at 70° C. After the dropwise addition was completed, the mixture was further reacted for 18 hours to obtain the solution of a copolymer (the concentration of the solid content was 29.4% by mass). The weight-average molecular weight, Mw, of the obtained copolymer was 29,200 (in terms of polystyrene).

Synthesis Example 9

6.5 g of 4-hydroxyphenyl methacrylate, 8.3 g of a monomer of Formula (2-13), 9.9 g of N-phenylmaleimide, and 1.5 g of 2,2'-azobisisobutyronitrile were dissolved in 39.2 g of propylene glycol monomethylether acetate. The solution was then added dropwise over four hours into a flask in which 21.8 g of propylene glycol monomethylether acetate was kept at 70° C. After the dropwise addition was completed, the mixture was further reacted for 18 hours to obtain the solution of a copolymer (the concentration of the solid content was 29.9% by mass). The weight-average molecular weight, Mw, of the obtained copolymer was 24,300 (in terms of polystyrene).

Synthesis Example 10

7.0 g of 4-hydroxyphenyl methacrylate, 6.8 g of a monomer of Formula (2-15), 11.1 g of N-cyclohexylmaleimide, and 1.5 g of 2,2'-azobisisobutyronitrile were dissolved in 39.5 g of propylene glycol monomethylether acetate. The solution was then added dropwise over four hours into a flask in which 21.9 g of propylene glycol monomethylether acetate was kept at 70° C. After the dropwise addition was completed, the mixture was further reacted for 18 hours to obtain the solution of a copolymer (the concentration of the solid content was 28.0% by mass). The weight-average molecular weight, Mw, of the obtained copolymer was 28,500 (in terms of polystyrene).

Synthesis Example 11

8.0 g of 4-hydroxyphenyl methacrylate, 6.4 g of a monomer of Formula (2-7), 1.8 g of indene, 8.1 g of N-cyclohexylmaleimide, and 1.5 g of 2,2'-azobisisobutyronitrile were dissolved in 38.4 g of propylene glycol monomethylether acetate. The solution was then added dropwise over four hours into a flask in which 21.3 g of propylene glycol monomethylether acetate was kept at 70° C. After the dropwise addition was completed, the mixture was further reacted for 18 hours to obtain the solution of a copolymer (the concentration of the solid content was 28.5% by mass). The weight-average molecular weight, Mw, of the obtained copolymer was 27,800 (in terms of polystyrene).

Synthesis Example 12

6.0 g of 4-hydroxyphenyl methacrylate, 4.8 g of a monomer of Formula (2-7), 13.0 g of phenoxyethyl acrylate, and 1.5 g of 2,2'-azobisisobutyronitrile were dissolved in 37.7 g of propylene glycol monomethylether acetate. The solution was then added dropwise over four hours into a flask in which 21.0 g of propylene glycol monomethylether acetate was kept at 70° C. After the dropwise addition was completed, the mixture was further reacted for 18 hours to obtain the solution of a copolymer (the concentration of the solid content was 29.5% by mass). The weight-average molecular weight, Mw, of the obtained copolymer was 34,000 (in terms of polystyrene).

Synthesis Example 13

9.0 g of 4-hydroxyphenyl methacrylate, 7.2 g of a monomer of Formula (2-7), 2.7 g of 4-tert-butylstyrene, 6.5 g of n-butyl acrylate, and 1.6 g of 2,2'-azobisisobutyronitrile were dissolved in 40.3 g of propylene glycol monomethylether acetate. The solution was then added dropwise over four hours into a flask in which 22.4 g of propylene glycol monomethylether acetate was kept at 70° C. After the dropwise addition was completed, the mixture was further reacted for 18 hours to obtain the solution of a copolymer (the concentration of the solid content was 29.2% by mass). The weight-average molecular weight, Mw, of the obtained copolymer was 31,500 (in terms of polystyrene).

Synthesis Example 14

9.0 g of 4-hydroxyphenyl methacrylate, 7.2 g of a monomer of Formula (2-7), 6.0 g of isobornyl acrylate, 1.6 g of N-methylmaleimide, and 1.5 g of 2,2'-azobisisobutyronitrile were dissolved in 37.8 g of propylene glycol monomethylether acetate. The solution was then added dropwise over four hours into a flask in which 21.0 g of propylene glycol monomethylether acetate was kept at 70° C. After the dropwise addition was completed, the mixture was further reacted for 18 hours to obtain the solution of a copolymer (the concentration of the solid content was 28.9% by mass). The weight-average molecular weight, Mw, of the obtained copolymer was 31,800 (in terms of polystyrene).

Synthesis Example 15

8.0 g of 4-hydroxyphenyl methacrylamide, 7.5 g of a monomer of Formula (2-7), 2.3 g of 2-vinylnaphthalene, 2.4 g of benzyl acrylate, 3.9 g of N-phenylmaleimide, and 1.5 g of 2,2'-azobisisobutyronitrile were dissolved in 38.4 g of propylene glycol monomethylether. The solution was then added dropwise over four hours into a flask in which 21.3 g of propylene glycol monomethylether was kept at 70° C. After the dropwise addition was completed, the mixture was further reacted for 18 hours to obtain the solution of a copolymer (the concentration of the solid content was 29.1% by mass). The weight-average molecular weight, Mw, of the obtained copolymer was 11,100 (in terms of polystyrene).

Synthesis Example 16

18.0 g of 4-hydroxyphenyl methacrylate and 0.90 g of 2,2'-azobisisobutyronitrile were dissolved in 35.1 g of propylene glycol monomethylether. The solution was then added dropwise over four hours into a flask in which 21.6 g of propylene glycol monomethylether was kept at 70° C. After the dropwise addition was completed, the mixture was further reacted for 18 hours to obtain the solution of a copolymer (the concentration of the solid content was 25% by mass). The weight-average molecular weight, Mw, of the obtained copolymer was 32,000 (in terms of polystyrene).

Synthesis Example 17

22.0 g of a monomer of Formula (2-7) and 1.1 g of 2,2'-azobisisobutyronitrile were dissolved in 34.7 g of propylene glycol monomethylether acetate. The solution was then added dropwise over four hours into a flask in which 19.3 g of propylene glycol monomethylether acetate was kept at 70° C. After the dropwise addition was completed, the mixture was further reacted for 18 hours to obtain the solution of a copolymer (the concentration of the solid content was 30% by mass). The weight-average molecular weight, Mw, of the obtained copolymer was 15,000 (in terms of polystyrene).

[Preparation of Non-Photosensitive Resin Composition]

Example 1

50.0 g of the solution of the copolymer obtained in Synthesis Example 1 and 0.01 g of MEGAFAC [registered trademark] R-30 (manufactured by DIC Corporation) as a surfactant were dissolved in 12.5 g of propylene glycol monomethylether acetate to obtain a solution. Then, the solution was filtrated through a polyethylene microfilter having a pore size of 0.10 μm to prepare a non-photosensitive resin composition.

Example 2

50.0 g of the solution of the copolymer obtained in Synthesis Example 2 and 0.01 g of MEGAFAC [registered trademark] R-30 (manufactured by DIC Corporation) as a surfactant were dissolved in 12.5 g of propylene glycol monomethylether to obtain a solution. Then, the solution was filtrated through a polyethylene microfilter having a pore size of 0.10 μm to prepare a non-photosensitive resin composition.

Example 3

50.0 g of the solution of the copolymer obtained in Synthesis Example 3 and 0.01 g of MEGAFAC [registered trademark] R-30 (manufactured by DIC Corporation) as a surfactant were dissolved in 15.1 g of propylene glycol monomethylether and 0.3 g of propylene glycol monomethylether acetate to obtain a solution. Then, the solution was filtrated through a polyethylene microfilter having a pore size of 0.10 μm to prepare a non-photosensitive resin composition.

Example 4

50.0 g of the solution of the copolymer obtained in Synthesis Example 4 and 0.01 g of MEGAFAC [registered trademark] R-30 (manufactured by DIC Corporation) as a surfactant were dissolved in 1.2 g of propylene glycol monomethylether, 5.9 g of ethyl lactate, and 2.4 g of γ-butyrolactone to obtain a solution. Then, the solution was filtrated through a polyethylene microfilter having a pore size of 0.10 μm to prepare a non-photosensitive resin composition.

Example 5

50.0 g of the solution of the copolymer obtained in Synthesis Example 5 and 0.01 g of MEGAFAC [registered trademark] R-30 (manufactured by DIC Corporation) as a surfactant were dissolved in 1.1 g of propylene glycol monomethylether, 2.1 g of ethyl lactate, and 2.1 g of γ-butyrolactone to obtain a solution. Then, the solution was filtrated through a polyethylene microfilter having a pore size of 0.10 μm to prepare a non-photosensitive resin composition.

Example 6

50.0 g of the solution of the copolymer obtained in Synthesis Example 6, 0.3 g of triphenylphosphine as a curing accelerator, and 0.01 g of MEGAFAC [registered trademark] R-30 (manufactured by DIC Corporation) as a surfactant were dissolved in 7.0 g of propylene glycol monomethylether and 18.1 g of propylene glycol monomethylether acetate to obtain a solution. Then, the solution was filtrated through a polyethylene microfilter having a pore size of 0.10 μm to prepare a non-photosensitive resin composition.

Example 7

50.0 g of the solution of the copolymer obtained in Synthesis Example 7, 0.3 g of triphenylphosphine as a curing accelerator, and 0.01 g of MEGAFAC [registered trademark] R-30 (manufactured by DIC Corporation) as a surfactant were dissolved in 16.2 g of propylene glycol monomethylether and 2.9 g of propylene glycol monomethylether acetate to obtain a solution. Then, the solution was filtrated through a polyethylene microfilter having a pore size of 0.10 μm to prepare a non-photosensitive resin composition.

Example 8

50.0 g of the solution of the copolymer obtained in Synthesis Example 8 and 0.01 g of MEGAFAC [registered trademark] R-30 (manufactured by DIC Corporation) as a surfactant were dissolved in 17.7 g of propylene glycol monomethylether and 5.9 g of cyclohexanone to obtain a solution. Then, the solution was filtrated through a polyethylene microfilter having a pore size of 0.10 μm to prepare a non-photosensitive resin composition.

Example 9

50.0 g of the solution of the copolymer obtained in Synthesis Example 9 and 0.01 g of MEGAFAC [registered trademark] R-30 (manufactured by DIC Corporation) as a surfactant were dissolved in 8.8 g of propylene glycol monomethylether to obtain a solution. Then, the solution was filtrated through a polyethylene microfilter having a pore size of 0.10 μm to prepare a non-photosensitive resin composition.

Example 10

50.0 g of the solution of the copolymer obtained in Synthesis Example 10 and 0.01 g of MEGAFAC [registered trademark] R-30 (manufactured by DIC Corporation) as a surfactant were dissolved in 9.0 g of propylene glycol monomethylether to obtain a solution. Then, the solution was filtrated through a polyethylene microfilter having a pore size of 0.10 μm to prepare a non-photosensitive resin composition.

Example 11

50.0 g of the solution of the copolymer obtained in Synthesis Example 11 and 0.01 g of MEGAFAC [registered trademark] R-30 (manufactured by DIC Corporation) as a surfactant were dissolved in 9.6 g of propylene glycol monomethylether and 2.5 g of propylene glycol monomethylether acetate to obtain a solution. Then, the solution was filtrated through a polyethylene microfilter having a pore size of 0.10 μm to prepare a non-photosensitive resin composition.

Example 12

50.0 g of the solution of the copolymer obtained in Synthesis Example 12 and 0.01 g of MEGAFAC [registered trademark] R-30 (manufactured by DIC Corporation) as a surfactant were dissolved in 9.9 g of propylene glycol monomethylether and 4.3 g of propylene glycol monomethylether acetate to obtain a solution. Then, the solution was filtrated through a polyethylene microfilter having a pore size of 0.10 μm to prepare a non-photosensitive resin composition.

Example 13

50.0 g of the solution of the copolymer obtained in Synthesis Example 13 and 0.01 g of MEGAFAC [registered trademark] R-30 (manufactured by DIC Corporation) as a surfactant were dissolved in 9.8 g of propylene glycol monomethylether and 3.7 g of propylene glycol monomethylether acetate to obtain a solution. Then, the solution was filtrated through a polyethylene microfilter having a pore size of 0.10 μm to prepare a non-photosensitive resin composition.

Example 14

50.0 g of the solution of the copolymer obtained in Synthesis Example 14 and 0.01 g of MEGAFAC [registered trademark] R-30 (manufactured by DIC Corporation) as a surfactant were dissolved in 10.3 g of propylene glycol monomethylether and 5.5 g of propylene glycol monomethylether acetate to obtain a solution. Then, the solution was filtrated through a polyethylene microfilter having a pore size of 0.10 μm to prepare a non-photosensitive resin composition.

Example 15

50.0 g of the solution of the copolymer obtained in Synthesis Example 15 and 0.01 g of MEGAFAC [registered trademark] R-30 (manufactured by DIC Corporation) as a surfactant were dissolved in 8.4 g of propylene glycol monomethylether and 11.0 g of ethyl lactate to obtain a solution. Then, the solution was filtrated through a polyethylene microfilter having a pore size of 0.10 μm to prepare a non-photosensitive resin composition.

Comparative Example 1

50.0 g of the solution of the copolymer obtained in Synthesis Example 16 and 0.01 g of MEGAFAC [registered trademark] R-30 (manufactured by DIC Corporation) as a surfactant were dissolved in 9.7 g of propylene glycol monomethylether acetate to obtain a solution. Then, the solution was filtrated through a polyethylene microfilter having a pore size of 0.10 μm to prepare a non-photosensitive resin composition.

Comparative Example 2

50.0 g of the solution of the copolymer obtained in Synthesis Example 17 and 0.02 g of MEGAFAC [registered trademark] R-30 (manufactured by DIC Corporation) as a surfactant were dissolved in 8.8 g of propylene glycol monomethylether to obtain a solution. Then, the solution was filtrated through a polyethylene microfilter having a pore size of 0.10 μm to prepare a non-photosensitive resin composition.

Comparative Example 3

50.0 g of the solution of the copolymer obtained in Synthesis Example 1, 3.2 g of P-200 (manufactured by Toyo Gosei Co., Ltd.) as a photosensitizer, and 0.02 g of MEGAFAC [registered trademark] R-30 (manufactured by DIC Corporation) as a surfactant were dissolved in 1.6 g of propylene glycol monomethylether and 14.7 g of propylene glycol monomethylether acetate to obtain a solution. Then, the solution was filtrated through a polyethylene microfilter having a pore size of 0.10 μm to prepare a photosensitive resin composition.

[Chemical Resistance Test]

Each of the resin compositions prepared in Examples 1 to 15 and Comparative Examples 1 to 3 was applied onto a silicon wafer by using a spin coater, and the resin composition was baked at 100° C. for one minute, and further, at 230° C. for five minutes on a hot plate to form a film having a film thickness of 2 μm. Each of these films was soaked in propylene glycol monomethylether, propylene glycol monomethylether acetate, ethyl lactate, butyl acetate, methyl 3-methoxy propionate, acetone, methyl isobutyl ketone, 2-heptanone, 2-propanol, N-methylpyrrolidone, or a tetramethylammonium hydroxide (TMAH) aqueous solution having a concentration of 2.38% by mass, under a temperature condition of 23° C., for 10 minutes for testing. The film thickness of each film before and after soaking was measured, and the change in the film thickness between before and after soaking was calculated. When 10% or more of increase or decrease in the film thickness compared to the film thickness before soaking was found for any one of the solvents for soaking, the chemical resistance was evaluated as "x," and when less than 10% of increase or decrease in the film thickness was found for all of the solvents for soaking, the chemical resistance was evaluated as "○." Table 1 shows the results of evaluations.

[Measurement of Transmittance]

Each of the non-photosensitive resin compositions prepared in Examples 1 to 15 and the photosensitive resin compositions prepared in Comparative Example 3 was applied onto a quartz substrate by using a spin coater, and was baked at 100° C. for one minute, and further, at 230° C. for five minutes on a hot plate to form a film having a film thickness of 2 μm. A transmittance was measured for each of these films at each of the wavelengths set every 2 nm within a range from 400 nm to 800 nm by using the ultraviolet-visible spectrophotometer UV-2550 (manufactured by Shimadzu Corporation). The film was further heated at 260° C. for five minutes, and then a transmittance was measured at each of the wavelengths set every 2 nm within a range from 400 nm to 800 nm again. Note that a transmittance required for a cured film for microlenses is generally not less than 90%. The values of the minimum transmittance measured at wavelengths within a range of 400 nm to 800 nm, before and after heating at 260° C. for five minutes, are shown in Table 1.

[Measurement of Dry Etching Rate]

The following are the etcher and etching gas used for measuring dry etching rates.

Etcher: RIE-10NR (manufactured by SAMCO INC.)
Etching gas: $CF_4$.

Each of the non-photosensitive resin compositions prepared in Examples 1 to 15 was applied onto a silicon wafer by using a spin coater, and was baked at 100° C. for one minute, and further, at 230° C. for five minutes on a hot plate to form a film having a film thickness of 2 μm. The dry etching rates of these films were measured by using the etcher and the etching gas. Similarly, the resist solution (THMR-IP1800 (manufactured by TOKYO OHKA KOGYO CO., LTD.) was applied onto a silicon wafer by using a spin coater, and was baked at 90° C. for 1.5 minutes on a hot plate to form a resist film having a film thickness of 1 μm, and a dry etching rate was measured. Then, a ratio between a dry etching rate of each film obtained from the non-photosensitive resin compositions prepared in Examples 1 to 15 and a dry etching rate of the resist film was calculated. When a microlens is produced by the etch back method, the dry etching rate X of the resist film and the dry etching rate Y of the resin film are required to be equivalent with each other (X:Y=1:0.8 to 1.2) in order to accurately transfer the shape of a lens pattern to an underlayer resin film. Table 1 shows the results of evaluations.

[Level Difference Planarization Properties]

Each of the non-photosensitive resin compositions prepared in Examples 1 to 15 was applied onto a substrate with a level difference having a height of 0.5 μm, a line width of and a space between the lines of 10 μm (see FIG. 1) by using a spin coater, and was baked at 100° C. for one minute, and further, at 230° C. for five minutes on a hot plate to form a film having a film thickness of 2 μm. The planarization ratio was calculated from values of h1 (the level difference of a substrate with a level difference) that is shown in a substrate with a level difference 1 of FIG. 1, and h2 (the level difference of a cured film, that is, the difference in height between the height of a cured film on a line and the height of a cured film in a space), with the "expression: $(1-(h2/h1))\times100$." Table 1 shows the results of evaluations.

TABLE 1

| | Chemical Resistance | Minimum Transmittance/ % (Wavelength of 400 nm to 800 nm) | | Planarization Ratio | Ratio of Dry Etching Rate (To Resist) |
|---|---|---|---|---|---|
| | | 230° C. | 260° C. | | |
| Example 1 | ○ | 97 | 96 | 75% | 1.1 |
| Example 2 | ○ | 97 | 96 | 93% | 0.9 |
| Example 3 | ○ | 95 | 95 | 86% | 0.8 |
| Example 4 | ○ | 97 | 96 | 83% | 1.2 |
| Example 5 | ○ | 94 | 94 | 93% | 0.9 |
| Example 6 | ○ | 96 | 94 | 88% | 1.0 |
| Example 7 | ○ | 97 | 97 | 95% | 0.9 |
| Example 8 | ○ | 96 | 94 | 81% | 1.0 |
| Example 9 | ○ | 96 | 94 | 83% | 1.0 |
| Example 10 | ○ | 98 | 96 | 94% | 1.1 |
| Example 11 | ○ | 97 | 95 | 73% | 1.0 |
| Example 12 | ○ | 97 | 95 | 85% | 1.0 |
| Example 13 | ○ | 98 | 98 | 89% | 1.0 |
| Example 14 | ○ | 98 | 98 | 72% | 1.1 |
| Example 15 | ○ | 96 | 95 | 68% | 0.9 |
| Comparative Example 1 | X | — | — | — | — |
| Comparative Example 2 | X | — | — | — | — |
| Comparative Example 3 | ○ | 84 | 86 | — | — |

The results shown in Table 1 indicate that a film formed from a non-photosensitive resin composition of the present invention is highly chemical resistant and highly transparent, as well as being highly heat resistant, such that the film was not colored even after being heated at 260° C. All of the films formed from the non-photosensitive resin compositions of the present invention have level difference planarization properties with 50% or more of planarization ratio. Among them, films formed from the non-photosensitive resin compositions prepared in Examples 2 to 10, 12, and 13 have excellent level difference planarization properties with 80% or more of planarization ratio. As mentioned above, when a microlens is produced by the etch back method, the dry etching rate X of the resist film and the dry etching rate Y of the resin film are required to be equivalent with each other (X:Y=1:0.8 to 1.2) in order to accurately transfer the shape of a lens pattern to an underlayer resin film, and all of the films formed from the non-photosensitive resin compositions of the present invention satisfied this requirement.

In contrast, the films formed from the non-photosensitive resin compositions of Comparative Examples 1 and 2 did not show satisfying chemical resistance, and thus it was found that these films are not suitable as protection films, planarizing films, as well as not suitable for microlenses.

Although the cured film formed from the photosensitive resin composition prepared in Comparative Example 3 showed satisfying solvent resistance, its transmittance was less than 90%. As mentioned above, a transmittance required for a cured film for microlenses is typically not less than 90%, and thus it was found that a photosensitive resin composition, such as the one prepared in Comparative Example 3, is not suitable as a resin composition for microlenses that are produced by the etch back method.

DESCRIPTION OF THE REFERENCE NUMERALS

1 Substrate with a level difference
2 Cured film
3 Line width
4 Space between lines
h1 Level difference of substrate with a level difference
h2 Level difference of cured film

The invention claimed is:

1. A non-photosensitive resin composition consisting of:
a self-cross-linkable copolymer having structural units of Formulae (1) and (2):

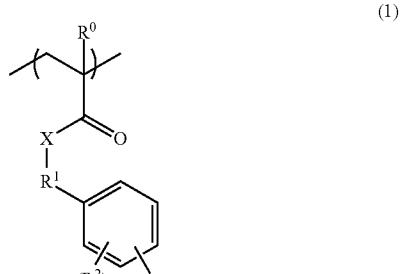

(1)

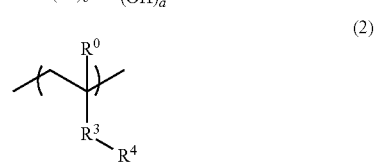

(2)

wherein in Formulae (1) and (2), each $R^0$ is independently a hydrogen atom or a methyl group; X is an —O— group or an —NH— group; le is a single bond or a $C_{1-6}$ alkylene group; $R^2$ is a $C_{1-6}$ alkyl group; a is an integer of 1 to 5, b is an integer of 0 to 4, and when a and b satisfy $1 \le a+b \le 5$, and b is 2, 3, or 4, such $R^2$ optionally differ from each other; $R^3$ is a divalent organic group of Formula (I), Formula (II), or Formula (III), and when $R^3$ is a divalent organic group of Formula (I), a carbonyl group in Formula (I) is bonded to a main chain of a structural unit of Formula (2); and $R^4$ is an organic group having an epoxy group:

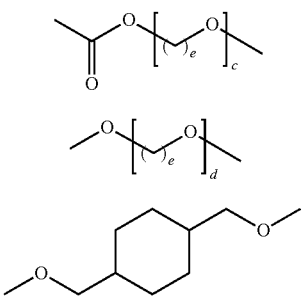

wherein in Formulae (I), (II), and (III), c is an integer of 0 to 3, d is an integer of 1 to 3, and each e is independently an integer of 2 to 6;
a solvent;
a surfactant; and
one or more additives selected from the group consisting of an ultraviolet absorber, a plasticizer, an antioxidant an adhesion auxiliary agent and an antifoaming agent,
wherein the non-photosensitive resin composition does not contain a quinone diazide compound.

2. The non-photosensitive resin composition according to claim 1, wherein
a structural unit of Formula (2) is a structural unit of Formula (2-1) or Formula (2-2):

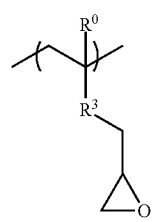

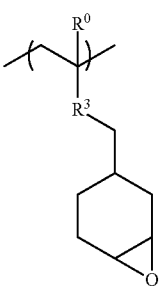

wherein in Formulae (2-1) and (2-2), $R^0$ and $R^3$ are the same as defined in claim 1.

3. The non-photosensitive resin composition according to claim 1, wherein
the self-cross-linkable copolymer is a copolymer further having at least one of structural units of Formulae (3) to (6):

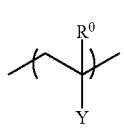

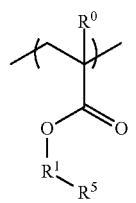

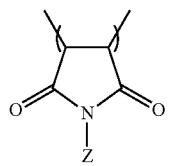

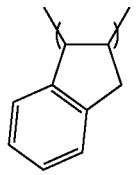

wherein in Formulae (3) to (6), $R^0$ and $R^1$ are the same as defined in claim 1; Y is a phenyl group, a biphenylyl group, or a naphthyl group, in which a part or all of hydrogen atoms of the phenyl group, the biphenylyl group, and the naphthyl group are optionally substituted with a $C_{1-10}$ alkyl group, a $C_{1-10}$ alkoxy group, a hydroxy group, a cyano group, or a halogeno group; $R^5$ is a linear, branched, or cyclic hydrocarbon group having a carbon atom number of 1 to 20, a phenyl group, a biphenylyl group, a naphthyl group, a $C_{1-10}$ alkoxy group, a phenoxy group, a biphenoxy group, or a naphthoxy group; Z is a $C_{1-5}$ alkyl group, a $C_5$ or $C_6$ cycloalkyl group, a phenyl group, or a benzyl group, in which a part or all of hydrogen atoms of the alkyl group, the cycloalkyl group, the phenyl group, and the benzyl group in Z are optionally substituted with a halogeno group or a hydroxy group.

4. The non-photosensitive resin composition according to claim 1, wherein
a weight-average molecular weight of the self-cross-linkable copolymer is 1,000 to 100,000.

5. The non-photosensitive resin composition according to claim 1, wherein
the non-photosensitive resin composition is for a protection film.

6. A protection film produced from the non-photosensitive resin composition as claimed in claim 5.

7. The non-photosensitive resin composition according to claim 1, wherein
the non-photosensitive resin composition is for a planarizing film.

8. A planarizing film produced from the non-photosensitive resin composition as claimed in claim 7.

9. The non-photosensitive resin composition according to claim 1, wherein
the non-photosensitive resin composition is for a microlens.

10. A microlens produced from the non-photosensitive resin composition as claimed in claim 9.

11. A method for producing a microlens, the method comprising:
applying the non-photosensitive resin composition as claimed in claim 9 onto a base material, and baking the non-photosensitive resin composition to form a resin film;

forming a resist pattern on the resin film;
reflowing the resist pattern by heat treatment to form a lens pattern; and
etching back the resin film by using the lens pattern as a mask to transfer the shape of the lens pattern to the resin film.

12. The method for producing a microlens according to claim 11, wherein
the base material is a substrate on which a color filter is formed.

13. A cured film obtained from the non-photosensitive resin composition as claimed in claim 1.

* * * * *